United States Patent
Yeh et al.

(10) Patent No.: US 9,337,927 B2
(45) Date of Patent: May 10, 2016

(54) TRANSMITTING APPARATUS AND RECEIVING APPARATUS FOR VISIBLE LIGHT COMMUNICATION, AND VISIBLE LIGHT COMMUNICATION SYSTEM

(71) Applicant: INDUSTRIAL TECHNOLOGY RESEARCH INSTITUTE, Hsinchu (TW)

(72) Inventors: Chien-Hung Yeh, Hsinchu (TW); Chi-Wai Chow, Fanling (HK); Yen-Liang Liu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 129 days.

(21) Appl. No.: 14/231,319

(22) Filed: Mar. 31, 2014

(65) Prior Publication Data
US 2015/0188630 A1    Jul. 2, 2015

(30) Foreign Application Priority Data
Dec. 31, 2013  (TW) .............................. 102149248 A

(51) Int. Cl.
*H04B 10/04* (2006.01)
*H04B 10/116* (2013.01)
(Continued)

(52) U.S. Cl.
CPC ............ *H04B 10/116* (2013.01); *H04B 10/532* (2013.01); *H04B 10/60* (2013.01)

(58) Field of Classification Search
CPC .... H04B 10/532; H04B 10/116; H04B 10/60; H04B 10/505; H04J 14/06
USPC ............................................ 398/184, 183, 152
See application file for complete search history.

(56) References Cited

U.S. PATENT DOCUMENTS

| 8,188,878 B2 | 5/2012 | Pederson et al. |
| 8,412,047 B2 * | 4/2013 | Tanaka ............... H04B 10/5053 398/102 |
| 2005/0123300 A1 * | 6/2005 | Kim .................... H04J 14/0226 398/84 |

(Continued)

FOREIGN PATENT DOCUMENTS

| TW | 406488 B | 9/2000 |
| TW | 201238264 A | 9/2012 |

(Continued)

OTHER PUBLICATIONS

Taiwan Patent Office, Office Action, Apr. 13, 2015, Taiwan.
(Continued)

*Primary Examiner* — M. R. Sedighian
(74) *Attorney, Agent, or Firm* — Locke Lord LLP; Tim Tingkang Xia, Esq.

(57) ABSTRACT

A transmitting apparatus and a receiving apparatus for visible light communication, and a visible light communication system are provided. The visible light communication system includes a transmitting apparatus and a receiving apparatus. The transmitting apparatus includes two transmitting modules. The transmitting modules include a plurality of visible light sources and a transmitting polarization plate. Polarizations of the two transmitting polarization plates are orthogonal to each other. The receiving apparatus includes two receiving modules. The receiving modules include a plurality of light detecting diodes and a receiving polarization plate. Polarizations of the paired receiving polarization plate and transmitting polarization plate are the same.

18 Claims, 8 Drawing Sheets

(51) Int. Cl.
*H04B 10/532* (2013.01)
*H04B 10/60* (2013.01)

(56) References Cited

U.S. PATENT DOCUMENTS

| | | |
|---|---|---|
| 2010/0029320 A1 | 2/2010 | Malladi et al. |
| 2010/0189437 A1* | 7/2010 | Hoshida ................ H04B 10/61 398/65 |
| 2012/0275795 A1 | 11/2012 | Chan et al. |
| 2013/0266314 A1 | 10/2013 | Lee et al. |

FOREIGN PATENT DOCUMENTS

| | | |
|---|---|---|
| TW | 201304435 A | 1/2013 |
| TW | 201339646 A | 10/2013 |

OTHER PUBLICATIONS

Thomas Q. Wang et al. Hemispherical lens based imaging receiver for MIMO optical wireless communications, 3rd IEEE Workshop on Optical Wireless Communications, 2012, p. 1239-1243.

Ahmad Helmi Azhar et al. A Gigabit/s Indoor Wireless Transmission Using MIMO-OFDM Visible-Light Communications, IEEE Photonics Technology Letters, 2013, p. 171-174, vol. 25, No. 2.

Jelena VUčlć et al. 513 Mbit/s Visible Light Communications Link Based on DMT-Modulation of a White LED, Journal of Lightwave Technology, 2010, p. 3512-3518, vol. 28, No. 24.

Jelena VUčlć et al. 230 Mbit/s via a Wireless Visible-Light Link based on OOK Modulation of Phosphorescent White LEDs, IEEE, 2010, OSA/OFC/NFOEC, OThH3.pdf.

Hoa Le Minh et al., 100-Mb/s NRZ Visible Light Communications Using a Postequalized White LED, IEEE Photonics Technology Letters, 2009, p. 1063-1065, vol. 21, No. 15.

G. Cossu et al., 3.4 Gbit/s visible optical wireless transmission based on RGB LED, Optics Express, 2012, B501-B506, vol. 20, No. 26.

* cited by examiner

TRANSMITTING APPARATUS AND RECEIVING APPARATUS FOR VISIBLE LIGHT COMMUNICATION, AND VISIBLE LIGHT COMMUNICATION SYSTEM

CROSS-REFERENCE TO RELATED APPLICATIONS

This non-provisional application claims priority under 35 U.S.C. §119(a) on Patent Application No(s). 102149248 filed in Taiwan, R.O.C. on Dec. 31, 2013, the entire contents of which are hereby incorporated by reference.

TECHNICAL FIELD

The disclosure relates to a transmitting apparatus and a receiving apparatus for visible light communication, and a visible light communication system.

BACKGROUND

Visible light communication (VLC) is wireless communication using visible light as transmission media such as light emitted by light emitting diodes (LED), laser diodes (LD), or compact fluorescent lamps (CFL). The visible light communication can be applied to indoor wireless network, indoor positioning, and communication between vehicles. Since the visible light communication supports illumination and communication, many companies and research institutions are devoted to it. Moreover, the bandwidth of the visible light communication is also very important to the communication field nowadays.

SUMMARY

According to one or more embodiments, the disclosure provides a transmitting apparatus. In one embodiment, the transmitting apparatus includes a first transmitting module and a second transmitting module. The first transmitting module includes a plurality of first visible light sources for generating a plurality of first optical signals, and a first transmitting polarization plate for modulating the first optical signals to generate a plurality of first modulated optical signals. The second transmitting module includes a plurality of second visible light sources for generating a plurality of second optical signals, and a second transmitting polarization plate for modulating the second optical signals to generate a plurality of second modulated optical signals. A polarization of the first transmitting polarization plate is orthogonal to a polarization of the second transmitting polarization plate.

According to one or more embodiments, the disclosure provides a receiving apparatus for visible light communication. In one embodiment, the receiving apparatus includes a first receiving module and a second receiving module. The first receiving module includes a plurality of first photodiodes for receiving a plurality of first demodulated optical signals, and a first receiving polarization plate for demodulating a plurality of first modulated optical signals to generate the first demodulated optical signals. The second receiving module includes a plurality of second photodiodes for receiving a plurality of second demodulated optical signals, and a second receiving polarization plate for demodulating a plurality of second modulated optical signals to generate the second demodulated optical signals. A polarization of the first transmitting polarization plate is orthogonal to a polarization of the second transmitting polarization plate.

According to one or more embodiments, the disclosure provides a visible light communication system. In one embodiment, the visible light communication system includes a transmitting apparatus and a receiving apparatus. The transmitting apparatus includes a first transmitting module and a second transmitting module. The first transmitting module includes a plurality of first visible light sources for generating a plurality of first optical signals, and a first transmitting polarization plate for modulating the first optical signals to generate a plurality of first modulated optical signals. The second transmitting module includes a plurality of second visible light sources for generating a plurality of second optical signals, and a second transmitting polarization plate for modulating the second optical signals. A polarization of the first transmitting polarization plate is orthogonal to a polarization of the second transmitting polarization plate. The receiving apparatus includes a first receiving module and a second receiving module. The first receiving module includes a plurality of first photodiodes for receiving the first demodulated optical signals, and a first receiving polarization plate for demodulating the first modulated optical signals to generate the first demodulated optical signals. The second receiving module includes a plurality of second photodiodes for receiving the second demodulated optical signals, and a second receiving polarization plate for demodulating the second modulated optical signals to generate the second demodulated optical signals. A polarization of the first receiving polarization plate and the polarization of the first transmitting polarization plate are the same, and a polarization of the second receiving polarization plate and the polarization of the second transmitting polarization plate are the same.

In one or more embodiments, the disclosure provides another visible light communication system. In one embodiment, the visible light communication system includes a transmitting terminal, a receiving terminal, and a polarization controller. The transmitting terminal includes at least one transmitting module group which includes a first transmitting module and a second transmitting module. The first transmitting module includes a plurality of first visible light sources for generating a plurality of first optical signals, and a first transmitting polarization plate for modulating the first optical signals for generating a plurality of first modulated optical signals. The second transmitting module includes a plurality of second visible light sources for generating a plurality of second optical signals, and a second transmitting polarization plate for modulating the second optical signals to generate a plurality of second modulated optical signals. A polarization of the first transmitting polarization plate is orthogonal to a polarization of the second transmitting polarization plate. The receiving terminal includes a first receiving module and a second receiving module. The first receiving module includes a plurality of first photodiodes for receiving the first demodulated optical signals, and a first receiving polarization plate for demodulating the first modulated optical signals to generate the first demodulated optical signals. The second receiving module includes a plurality of second photodiodes for receiving the second demodulated optical signals, and a second receiving polarization plate for demodulating a plurality of second modulated optical signals to generate the second demodulated optical signals. A polarization of the first receiving polarization plate and the polarization of the first transmitting polarization plate are the same, and a polarization of the second receiving polarization plate and the polarization of the second transmitting polarization plate are the same. The polarization controller determines a light intensity of the first demodulated optical signals received by the first receiving module, and determines a light intensity of the second demodulated optical signals received by the second receiving module, to rotate the first receiving polarization plate and the second receiving polarization plate.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
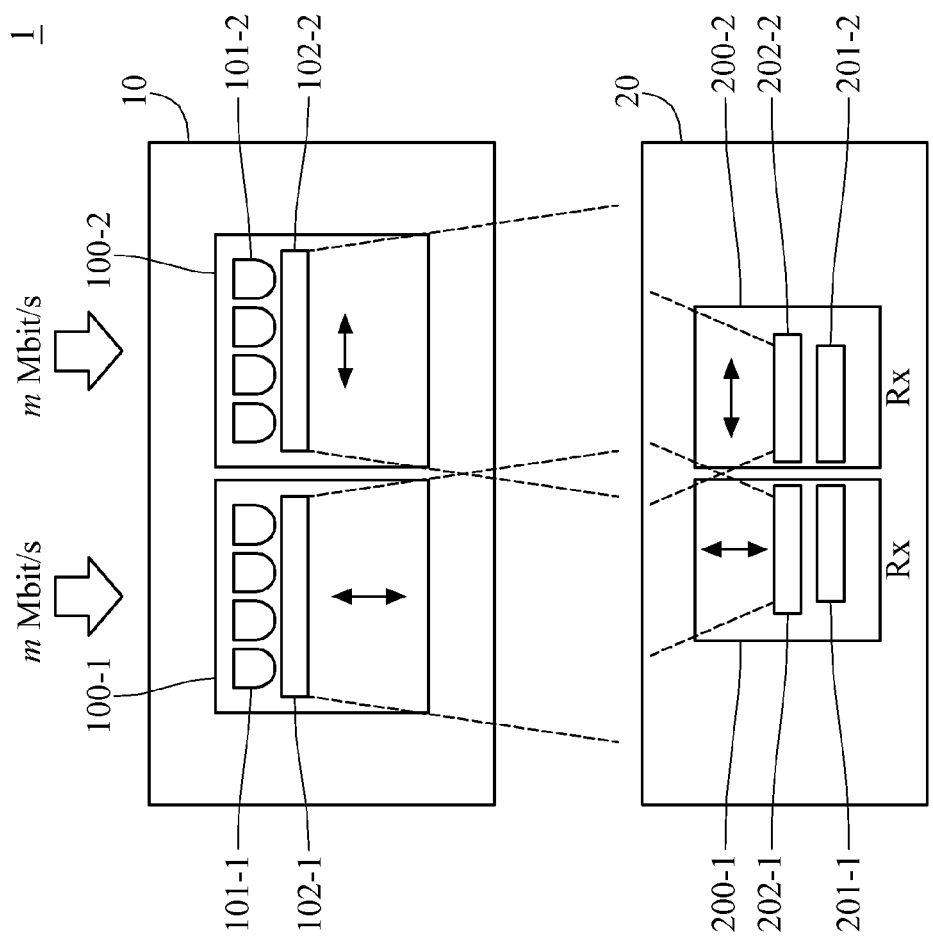
FIG. 1 is a block diagram of a visible light communication system in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In one or more embodiments, the disclosure provides a transmitting apparatus and a receiving apparatus for visible light communication, and a visible light communication system. The disclosure may be applied to optical signal transmission and use different orthogonal polarized light to transmit visible light signal.

FIG. 1 illustrates a block diagram of a visible light communication system 1 in an embodiment. The visible light communication system 1 includes a transmitting apparatus 10 and a receiving apparatus 20. Communication data is sent to the receiving apparatus 20 by the transmitting apparatus 10. The transmitting apparatus 10 includes two transmitting modules 100-1 and 100-2.

The transmitting module 100-1 (or called a first transmitting module) includes a plurality of first visible light sources 101-1 and a transmitting polarization plate 102-1 (or called a first transmitting polarization plate). The first visible light sources 101-1 generate a plurality of first optical signals, and the transmitting polarization plate 102-1 modulates the first optical signals. The transmitting module 100-2 (or called a second transmitting module) includes a plurality of second visible light sources 101-2 and a transmitting polarization plate 102-1 (or called a first transmitting polarization plate). The second visible light source 101-2 generates a plurality of second optical signals, and the transmitting polarization plate 102-2 (or called a second transmitting polarization plate) modulates the second optical signals. The polarizations of the two transmitting polarization plates 102-1 and 102-2 are orthogonal to each other.

The receiving apparatus 20 includes a receiving module 200-1 (or called a first receiving module) and a receiving module 200-2 (or called a second receiving module). The receiving module 200-1 includes a plurality of photodiodes 201-1 (or called first photodiodes) and a receiving polarization plate 202-1 (or called a first receiving polarization plate). The photodiodes 201-1 receive a plurality of first demodulated optical signals, and the receiving polarization plate 202-1 demodulates a plurality of first modulated optical signals to generate the first demodulated optical signals. The receiving module 200-2 includes a plurality of photodiodes 201-2 (or called second photodiodes) and a receiving polarization plate 202-2 (or called a second receiving polarization plate). The photodiodes 201-2 receive a plurality of second demodulated optical signals, and the receiving polarization plate 202-2 demodulates a plurality of second modulated optical signals to generate the second demodulated optical signals.

The polarization of the receiving polarization plate 202-1 and the polarization of the transmitting polarization plate 102-1 are the same, and the polarization of the receiving polarization plate 202-2 and the polarization of the transmitting polarization plate 102-2 are the same. For example, as shown in FIG. 1, the transmitting polarization plate 102-1 and the receiving polarization plate 202-1 are P-polarizers, and the transmitting polarization plate 102-2 and the receiving polarization plate 202-2 are S-polarizers. The receiving polarization plates 202-1 and 202-2 receive and demodulate the first optical signal and the second optical signal respectively. The perpendicular polarized light and the horizontal polarized light are guided to two receiving modules Rx in FIG. 1 by the receiving polarization plates 202-1 and 202-2 respectively. Moreover, since the polarized light of one of the two visible light sources is orthogonal to the polarized light of the other one of the two visible light sources, the optical signals of the visible light sources may not affect each other.

Figure 2A:
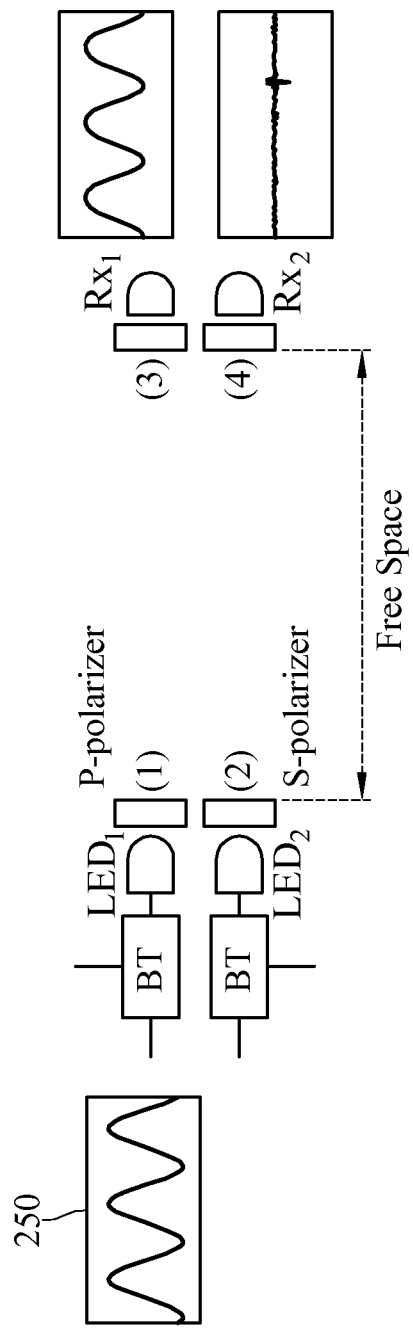
FIG. 2A and FIG. 2B are schematic views of an experiment in an embodiment.
Figure 2B:
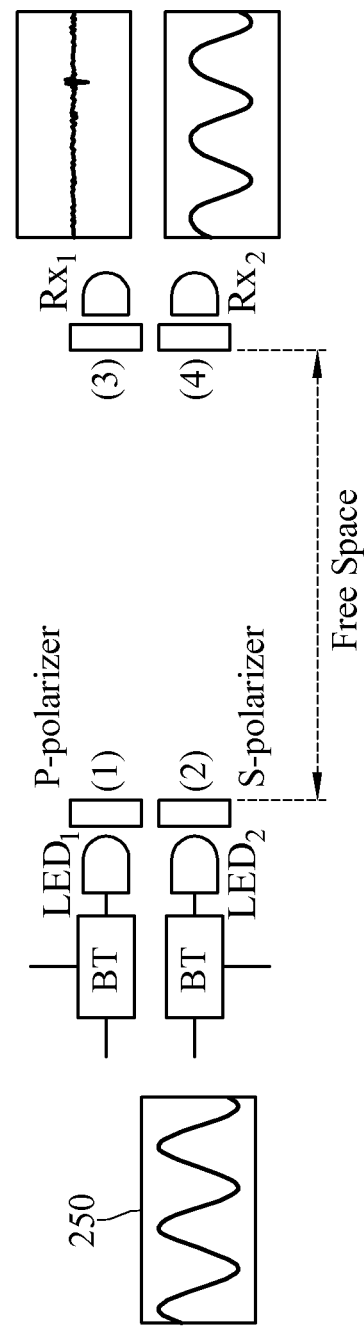

Take light emitting diodes as an example of the visible light sources. As shown in FIG. 2A and FIG. 2B, an experiment based on light emitting diodes is illustrated. In FIG. 2A, when a signal generator 250 supplies a sine signal to the light emitting diode $LED_1$ through a bias-tee circuit BT, the light emitting diode $LED_1$ emits an optical signal with a perpendicular polarization at the position (1) and is received by the receiving terminal at the position (3). Herein, since the optical signal with the perpendicular polarization is blocked by the S-polarizer at the position (4), the optical signal will not be received by the light emitting diode $LED_2$ at the position (4). Similarly, in FIG. 2B, when the signal generator 250 supplies the sine signal to the light emitting diode $LED_2$ through the bias-tee circuit BT, the light emitting diode $LED_2$ emits an optical signal with a horizontal polarization at the position (2) and is received and demodulated at the position (4). In this way, such orthogonal polarized light may provide about double transmission capacity of visible light communication based on light emitting diodes.

Figure 3:
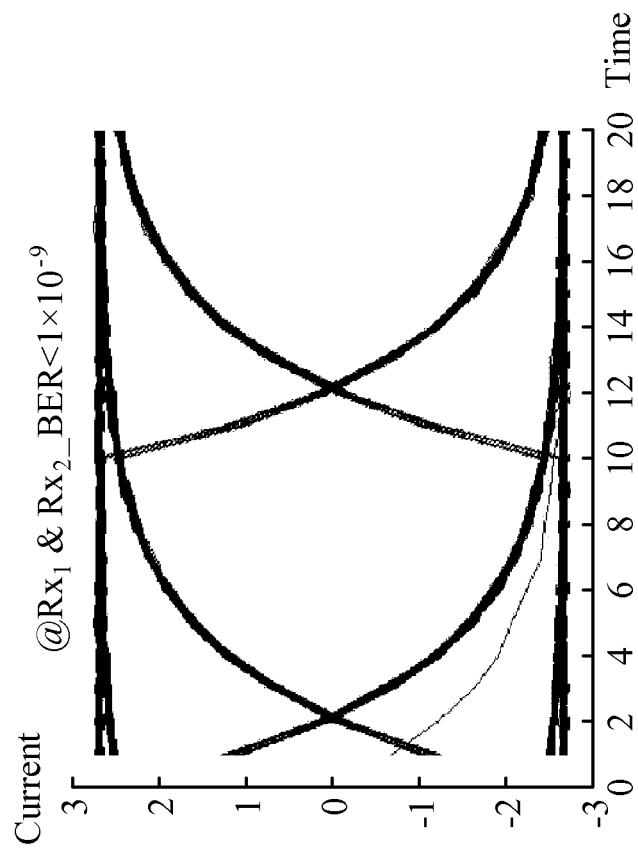
FIG. 3 is an eye diagram of an experiment in an embodiment.

For example, assume the two light emitting diodes $LED_1$ and $LED_2$ are applied with a modulation signal with on-off keying (OKK) of 10 Mbit/s, and the transmission distance between the light emitting diode and the receiving apparatus is about 2 meter. In this case, the simulation result on the bit error rate (BER) and its eye diagram is shown in FIG. 3. In FIG. 3, under a signal to noise ratio (SNR) of 20 dB, the BER is about $1\times10^{-9}$, and the eye diagram has an obvious open.

Figure 4:
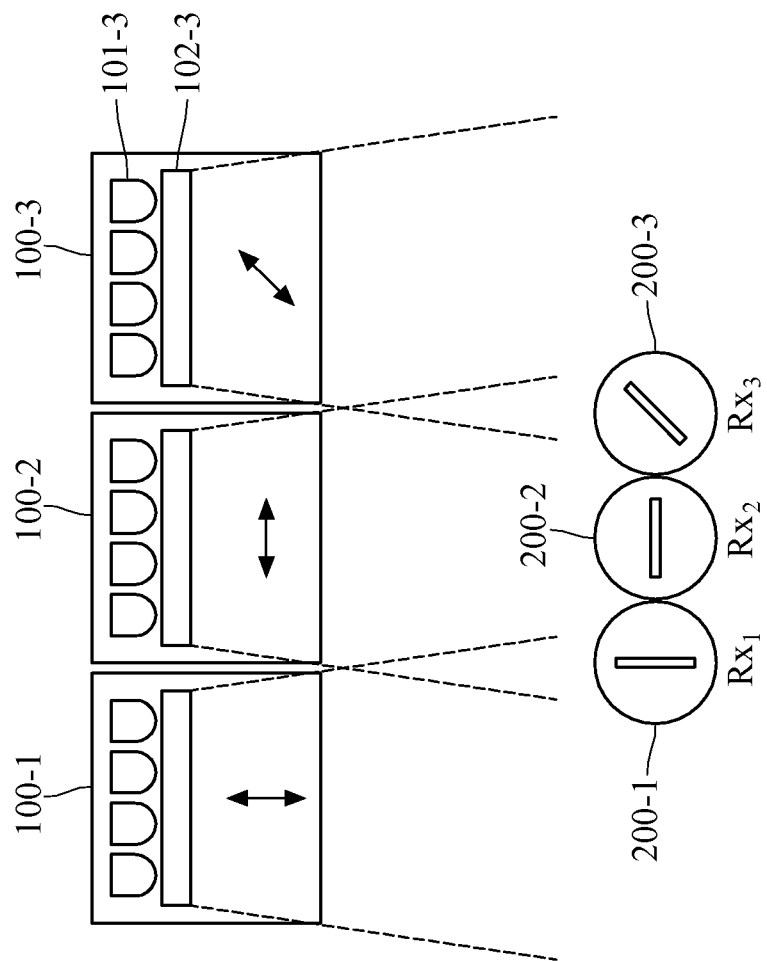
FIG. 4 is a schematic view of a visible light communication system in an embodiment.

FIG. 4 is a schematic view of a visible light communication system in an embodiment. Compared with the transmitting apparatus 10 in FIG. 1, the transmitting apparatus 10 in FIG. 4 further includes a third transmitting module 100-3, and compared with the receiving apparatus 20 in FIG. 1, the receiving apparatus 20 in FIG. 4 further includes a third receiving module 200-3. The transmitting modules 100-1 and 100-2 and the receiving modules 200-1 and 200-2 in FIG. 4 can be referred to relative components in FIG. 1.

The third transmitting module 100-3 includes a plurality of visible light sources 101-3 (or called third visible light sources) and a transmitting polarization plate 102-3 (or called a third transmitting polarization plate). The visible light sources 101-3 generate a plurality of third optical signals, and the transmitting polarization plate 102-3 modulates the third optical signals to generate a plurality of third modulated optical signals. The third receiving module 200-3 includes a plurality of third photodiodes and a third receiving polarization plate. The third photodiodes receive a plurality of third demodulated optical signals, and the third receiving polarization plate demodulates a plurality of third modulated optical signals to generate the third demodulated optical signals. For the third receiving module 200-3, the third demodulated optical signals and the third receiving polarization plate can be referred to relative components of the first receiving module 200-1 and the second receiving module 200-2 in FIG. 1.

The polarization of the transmitting polarization plate 102-3 and the polarization of each of the transmitting polarization plates 102-1 and 102-2 have a non-orthogonal angle α such as 30° or 45° therebetween. The polarization of the receiving polarization plate in the third receiving module 200-3 and the polarization of the transmitting polarization plate 102-3 are the same.

Take the non-orthogonal angle α of 45° as an example. In this case, assume the three visible light sources 101-1, 102-2 and 102-3 have the same optical output power. Since the polarizations related to the receiving modules 200-1 (Rx1) and 200-2 (Rx2) are orthogonal to each other, and the polarization related to the receiving module 200-3 (Rx3) is not orthogonal to the polarizations related to the receiving modules 200-1 (Rx1) and 200-2 (Rx2), the receiving module 200-1 (Rx1) receives not only the light from the visible light source 101-1 but also about the half of light power of the visible light source 101-3. Similarly, the receiving module 200-2 (Rx2) receives not only the light from the visible light source 101-2 but also about the half of light power of the visible light source 101-3, and the receiving module 200-3 (Rx3) receives not only the light from the visible light source 101-3 but also about the half of light power of the visible light source 101-1 and the half of light power of the visible light source 101-2. In other words, the receiving modules 200-1 (Rx1) and 200-2 (Rx2) may be affected by the half of power of the optical signal outputted by the visible light source 101-3, and the receiving module 200-3 (Rx3) may be affected by the half of power of the optical signal outputted by the visible light source 101-1 and the half of power of the optical signal outputted by the visible light source 101-2.

Moreover, take a simulation on this visible light communication system with three sets of light emitting diodes according to a modulation signal with an OOK of 10 Mbit/s, a transmission distance of 2 m, and the signal to noise ratio (SNR) of about 20 dB. The BER related to the receiving module 200-1 (Rx1) and the BER related to the receiving module 200-2 (Rx2) are about $2.5 \times 10^{-5}$, and the BER related to the receiving module 200-3 (Rx3) is about $1 \times 10^{-3}$. Since the forward error correction (FEC) value nowadays has been up to $3.8 \times 10^{-3}$, even though the BER related to the receiving module 200-3 (Rx3) is not good enough, this BER will not affect the signal decoding. Based on the arrangement shown in FIG. 3, the transmission capacity of visible light communication may become threefold.

Figure 5:
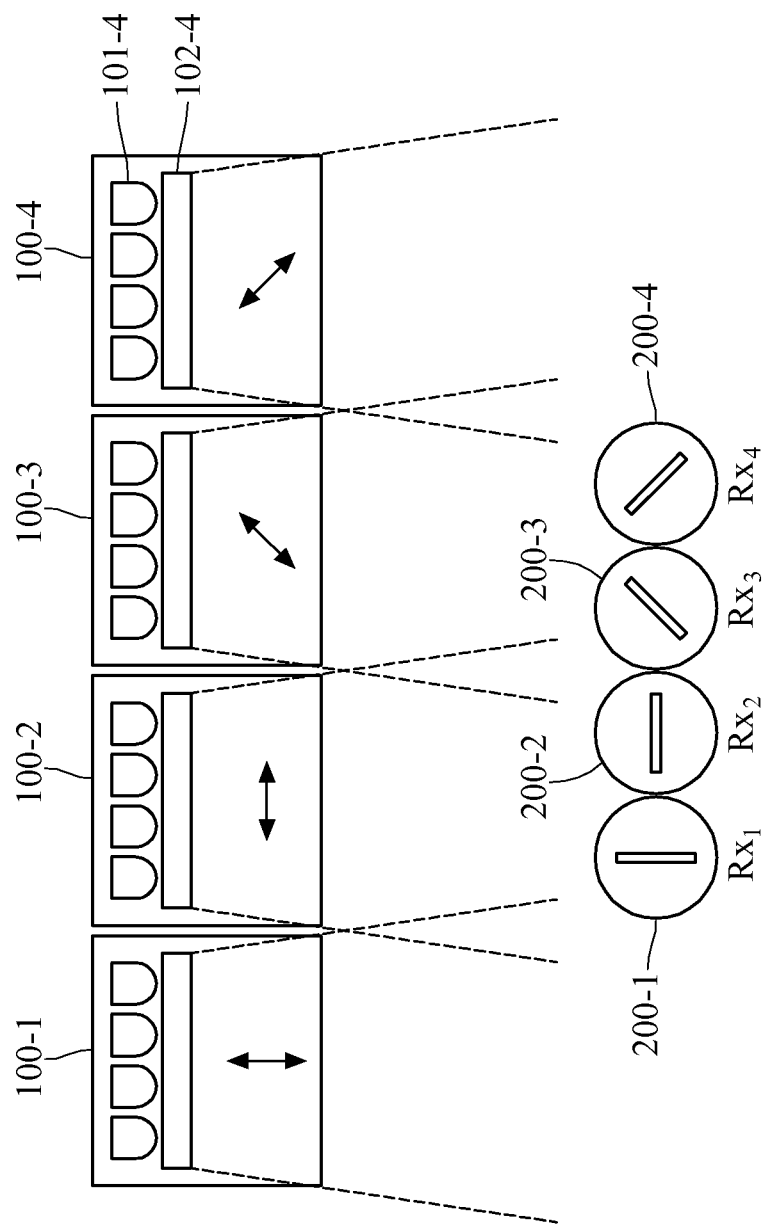
FIG. 5 is a schematic view of a visible light communication system in an embodiment.

FIG. 5 is a schematic view of a visible light communication system in an embodiment. Compared with the transmitting apparatus 10 in FIG. 4, the transmitting apparatus 10 in FIG. 5 further includes a fourth transmitting module 100-4. Compared with the receiving apparatus 20 in FIG. 4, the receiving apparatus 20 in FIG. 5 further includes a fourth receiving module 200-4. The transmitting modules 100-1, 100-2 and 100-3 and the receiving modules 100-1, 100-2 and 100-3 in FIG. 5 can be referred to those in FIG. 1 and FIG. 4.

The fourth transmitting module 100-4 includes a plurality of visible light sources 101-4 (or called fourth visible light sources) and a transmitting polarization plate 102-4 (or called a fourth transmitting polarization plate). The visible light sources 101-4 generate a plurality of fourth optical signals, and the transmitting polarization plate 102-4 modulates the fourth optical signals to generate a plurality of fourth modulated optical signals. The fourth receiving module 200-4 includes a plurality of fourth photodiodes and a fourth receiving polarization plate. The fourth photodiodes receive a plurality of fourth demodulated optical signals, and the fourth receiving polarization plate demodulates a plurality of fourth modulated optical signals to generate the fourth demodulated optical signals. For the fourth receiving module 200-4, the fourth demodulated optical signals and the fourth receiving polarization plate can be referred to relative components of the first receiving module 200-1 and the second receiving module 200-2 in FIG. 1.

The polarization of the transmitting polarization plate 102-4 is orthogonal to the polarization of the transmitting polarization plate in the transmitting module 100-3, and the polarization of the receiving polarization plate in the fourth receiving module 200-4 and the polarization of the transmitting polarization plate 102-4 are the same. As shown in FIG. 5, the polarized light of the transmitting module 101-1 is orthogonal to the polarized light of the transmitting module 101-2, and the polarized light of the transmitting module 101-3 is orthogonal to the polarized light of the transmitting module 101-4. Based on the arrangement shown in FIG. 5, the transmission capacity of visible light communication may become fourfold.

Figure 6:
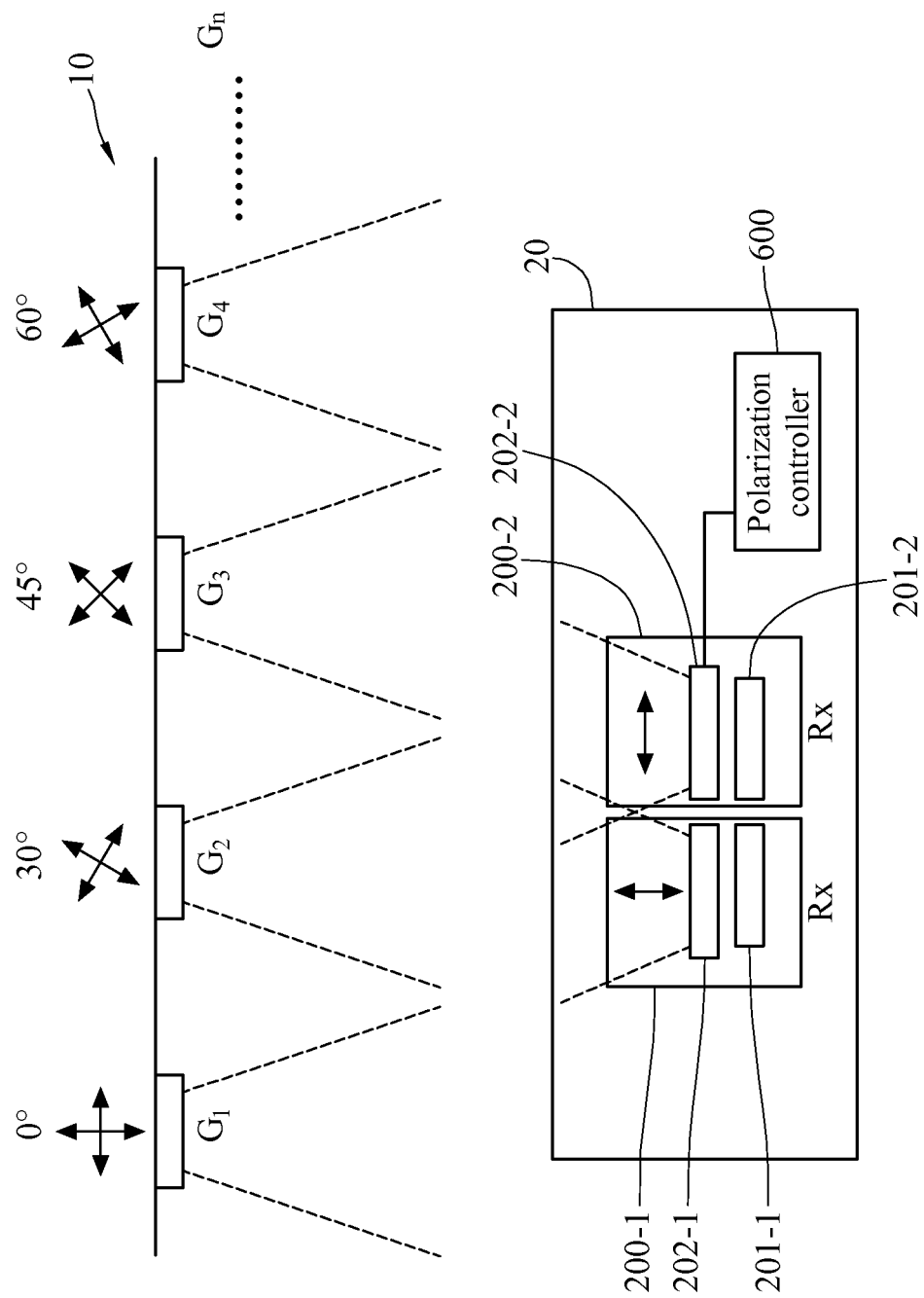
FIG. 6 is a schematic view of a parallel design of a visible light communication system.

In an embodiment, as shown in FIG. 6, a parallel design of a visible light communication system is illustrated. The transmitting terminal includes n transmitting module groups G1 to Gn, where n is a positive integer larger than 1. The transmitting module group Gx can be referred to the transmitting apparatus 10 in FIG. 1, where x is one of 1 to n. For example, the transmitting module group G1 includes a transmitting module 100-1 (or called a first transmitting module) and a transmitting module 100-2 (or called a second transmitting module). The transmitting module 100-1 includes a plurality of visible light sources 101-1 (or called first visible light sources) and a transmitting polarization plate 102-1 (or called a first transmitting polarization plate). The visible light sources 101-1 generate a plurality of first optical signals, and the transmitting polarization plate 102-1 modulates the first optical signals to generate a plurality of first modulated optical signals. The transmitting module 100-2 includes a plurality of visible light sources 101-2 (or called second visible light sources) and a transmitting polarization plate 102-2 (or called a second transmitting polarization plate). The visible light sources 101-2 generate a plurality of second optical signals, and the transmitting polarization plate 102-2 modulates the second optical signals to generate a plurality of second modulated optical signals. The polarizations of the transmitting polarization plates 102-1 and 102-2 are orthogonal to each other.

Similarly, the transmitting module group G2 includes a transmitting module 100-3 (or called a third transmitting module) and a transmitting module 100-4 (or called a fourth transmitting module). The transmitting module 100-3 includes a plurality of visible light sources 101-3 (or called third visible light sources) and a transmitting polarization plate 102-3 (or called a third transmitting polarization plate). The visible light sources 101-3 generate a plurality of third optical signals, and the transmitting polarization plate 102-3 modulates the third optical signals to generate a plurality of third modulated optical signals. The transmitting module 100-4 includes a plurality of visible light sources 101-4 (or called fourth visible light sources) and a transmitting polarization plate 102-4 (or called a fourth transmitting polarization plate). The visible light sources 101-4 generate a plurality of fourth optical signals, and the transmitting polarization plate 102-4 modulates the fourth optical signals to generate a plurality of fourth modulated optical signals. The polarizations of the transmitting polarization plates 102-3 and 102-4 are orthogonal to each other, and the polarizations of the third transmitting polarization plates 102-3 and 102-2 have a non-orthogonal angle therebetween.

The every adjacent two of the transmitting module groups G1 to Gn have an angle difference therebetween. For example, as shown in FIG. 6, the transmitting module groups G1 and G2 have an angle difference of 30° therebetween, the transmitting module groups G2 and G3 have an angle difference of 15° therebetween, and the transmitting module groups G3 and G4 have an angle difference of 15° therebetween. The transmitting module group Gx in FIG. 6 takes the two transmitting modules 100-1 and 10-2 as its example, but the disclosure will not be limited thereto.

On the other hand, the receiving terminal includes a receiving module 200-1 (or called a first receiving module) and a receiving module 200-2 (or called a second receiving module) as shown in the relative components in the receiving apparatus 20 in FIG. 1, and further includes a polarization controller 600. The receiving module 200-1 includes a plurality of photodiodes 201-1 (or called first photodiodes) and a receiving polarization plate 202-1 (or called a first receiving polarization plate). The photodiodes 201-1 receive the first demodulated optical signals, and the receiving polarization plate 202-1 demodulates the first modulated optical signals to generate the first demodulated optical signals. The receiving module 200-2 includes a plurality of photodiodes 201-2 (or called second photodiodes) and a receiving polarization plate 202-2 (or called a second receiving polarization plate). The photodiodes 201-2 receive the second demodulated optical signals, and the receiving polarization plate 202-2 demodulates a plurality of second modulated optical signals to generate the second demodulated optical signals. The polarizations of the receiving polarization plates 202-1 and 202-2 are orthogonal to each other. In FIG. 6, the receiving apparatus 20 takes the two receiving modules 200-1 and 200-2 to be an example, but the disclosure will not be limited thereto.

The polarization controller 600 rotates the receiving polarization plate 202-1 of the first receiving module 200-1 and the receiving polarization plate 202-2 of the second receiving module 200-2 in the receiving terminal according to the light intensities of the first demodulated optical signals received by the first receiving module 200-1, the light intensities of the second demodulated optical signals received by the second receiving module 200-2. Furthermore, the polarization controller 600 rotates the receiving polarization plate 202-1 of the first receiving module 200-1 and the receiving polarization plate 202-2 of the second receiving module 200-2 in the receiving terminal according to the light intensities of the third demodulated optical signals received by the first receiving module 200-1, the light intensities of the fourth demodulated optical signals received by the second receiving module 200-2.

The polarization controller 600 may continue to determine the above light intensities and rotate the receiving polarization plate 202-1 and the receiving polarization plate 202-2 until the light intensities approach a preset light intensity, e.g. a maximum light power. In other words, to determine whether to rotate the polarization plates is based on the light intensity (e.g. a maximum light power) of optical signal. If the light intensity approaches the preset light intensity (e.g. the light intensity is maximum), the polarization controller 600 will not rotate the receiving polarization plates 202-1 and 202-2. In contrast, if the light intensity does not approach the preset light intensity (e.g. the light intensity is not the maximum), the polarization controller 600 will rotate the receiving polarization plates 202-1 and 202-2 an angle.

In an embodiment, as shown in the transmitting apparatus 10 in FIG. 6, the transmitting module group Gx may include three, four or more than four transmitting modules which can be referred to relative components in FIG. 4 and FIG. 5, and the receiving apparatus may correspondingly include three, four or more than four receiving modules which can be referred to relative components in FIG. 4 and FIG. 5, where x is one of 1 to n.

Figure 7:
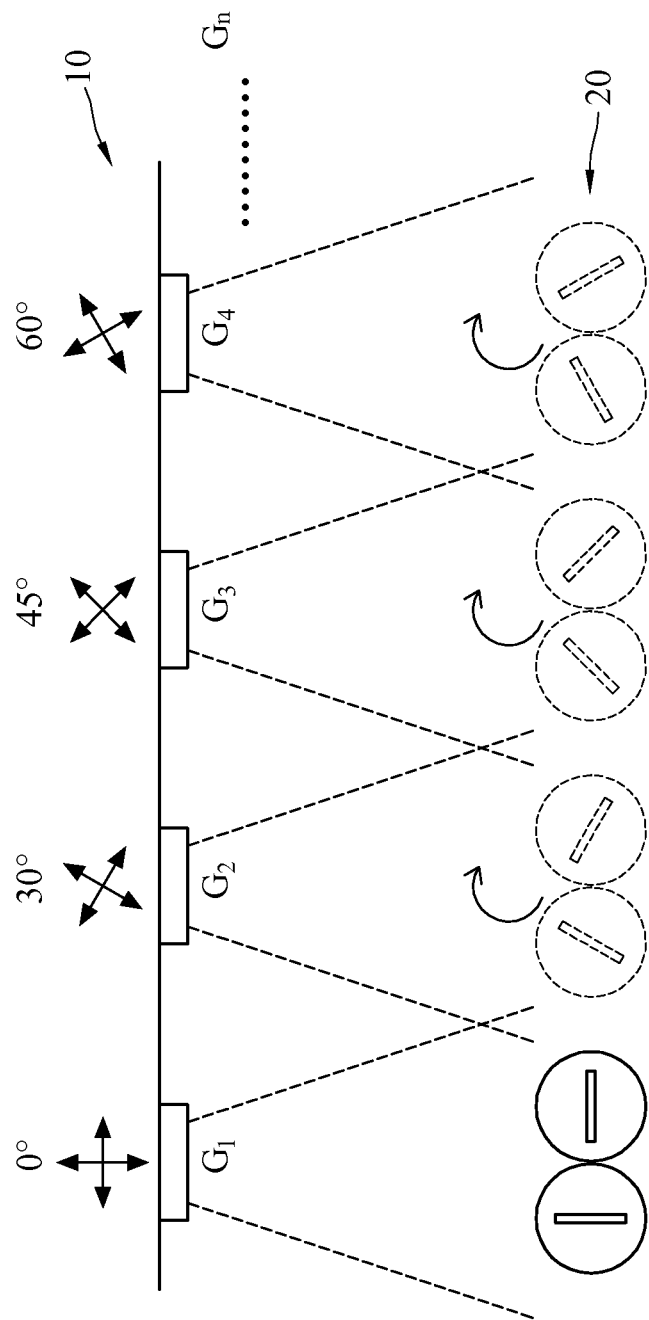
FIG. 7 is a schematic view of a parallel design of a visible light communication system.

As shown in FIG. 7, a parallel design of the visible light communication system in an embodiment is illustrated. For the receiving terminal, when the light source of the transmitting module group G1 is shifted to the transmitting module group G2, the polarization controller 600 will rotate the orthogonal polarizer related to the receiving apparatus 20 (Rx) 30 degrees, whereby data specified by the optical signal may be received by the transmitting module group G2 efficiently.

In one or more of the above embodiments, the visible light sources 101-1, 101-2, 101-3 and 101-4 may be light emitting diodes (LED), laser diodes (LD), compact fluorescent lamps (CFL), or any possible combination thereof.

Figure 8:
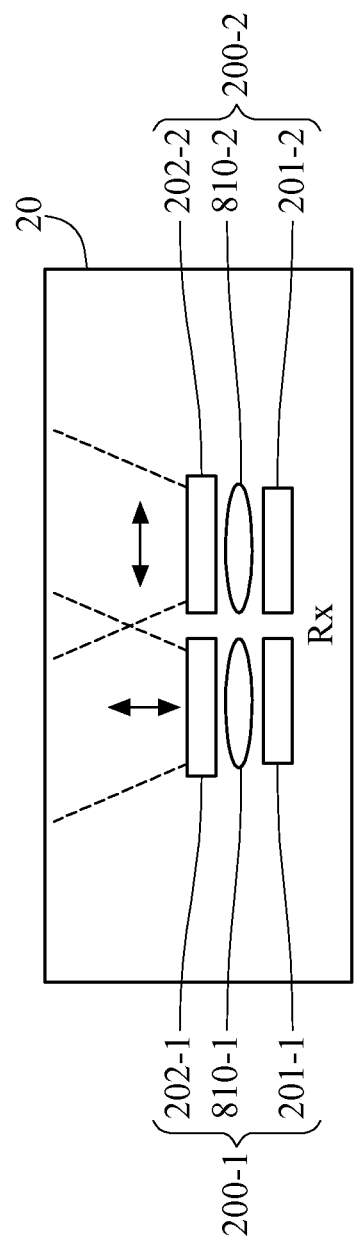
FIG. 8 is a schematic view of a receiving apparatus in an embodiment.

As shown in FIG. 8, other embodiment of the receiving apparatus 20 is illustrated. The receiving module 200-1 further includes at least one lens 810-1, and the receiving module 200-2 further includes at least one lens 810-2. The lens 810-1 is disposed between the receiving polarization plate 202-1 and the photodiode 201-1, and the lens 810-2 is disposed between the receiving polarization plate 202-2 and the photodiode 201-2.

In one or more of the above embodiments, the photodiodes 201-1 and 201-2 are P-intrinsic-N (PIN) photodiodes, avalanche photodiodes (APD), charge-coupled devices (CCD), or any possible combination thereof.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A transmitting apparatus for visible light communication, comprising:
   a first transmitting module, comprising a plurality of first visible light sources for generating a plurality of first optical signals, and a first transmitting polarization plate for modulating the first optical signals to generate a plurality of first modulated optical signals;
   a second transmitting module, comprising a plurality of second visible light sources for generating a plurality of second optical signals, and a second transmitting polarization plate for modulating the second optical signals to generate a plurality of second modulated optical signals; and a third transmitting module, comprising a plurality of third visible light sources for generating a plurality of third optical signals, and a third transmitting polarization plate for modulating the third optical signals to generate a plurality of third modulated optical signals, wherein a polarization of the first transmitting polarization plate is orthogonal to a polarization of the second transmitting polarization plate; and wherein a polarization of the third transmitting polarization plate is not orthogonal to the polarization of the second transmitting polarization plate.

2. The transmitting apparatus according to claim 1, further comprising:

a fourth transmitting module, comprising a plurality of fourth visible light sources for generating a plurality of fourth optical signals, and a fourth transmitting polarization plate for modulating the fourth optical signals to generate a plurality of fourth modulated optical signals, wherein a polarization of the fourth transmitting polarization plate is orthogonal to the polarization of the third transmitting polarization plate.

3. The transmitting apparatus according to claim 1, wherein the visible light sources are light emitting diodes, laser diodes, compact fluorescent lamps, or combinations thereof.

4. A receiving apparatus for visible light communication, comprising:

a first receiving module, comprising a plurality of first photodiodes for receiving a plurality of first demodulated optical signals, and a first receiving polarization plate for demodulating a plurality of first modulated optical signals to generate the first demodulated optical signals;

a second receiving module, comprising a plurality of second photodiodes for receiving a plurality of second demodulated optical signals, and a second receiving polarization plate for demodulating a plurality of second modulated optical signals to generate the second demodulated optical signals; and a third receiving module, comprising a plurality of third photodiodes for receiving a plurality of third demodulated optical signals, and a third receiving polarization plate for demodulating a plurality of third modulated optical signals to generate the third demodulated optical signals, wherein a polarization of the first receiving polarization plate is orthogonal to a polarization of the second receiving polarization plate; and wherein a polarization of the third receiving polarization plate is not orthogonal to the polarization of the second receiving polarization plate.

5. The receiving apparatus according to claim 4, wherein the first receiving module further comprises a first lens, disposed between the first photodiodes and the first receiving polarization plate.

6. The receiving apparatus according to claim 4, wherein the second receiving module further comprises a second lens, disposed between the second photodiodes and the second receiving polarization plate.

7. The receiving apparatus according to claim 4, further comprising:

a fourth receiving module, comprising a plurality of fourth photodiodes for receiving a plurality of fourth demodulated optical signals, and a fourth receiving polarization plate for demodulating a plurality of fourth modulated optical signals to generate the fourth demodulated optical signals;

wherein a polarization of the fourth receiving polarization plate is orthogonal to the polarization of the third receiving polarization plate.

8. The receiving apparatus according to claim 4, wherein the photodiodes are PIN photodiodes, avalanche photodiodes, charge-coupled devices (CCD) or combinations thereof.

9. A visible light communication system, comprising:

a transmitting apparatus, comprising:

a first transmitting module, comprising a plurality of first visible light sources for generating a plurality of first optical signals, and a first transmitting polarization plate for modulating the first optical signals to generate a plurality of first modulated optical signals; and a second transmitting module, comprising a plurality of second visible light sources for generating a plurality of second optical signals, and a second transmitting polarization plate for modulating the second optical signals to generate a plurality of second modulated optical signals; and a receiving apparatus, comprising:

a first receiving module, comprising a plurality of first photodiodes for receiving a plurality of first demodulated optical signals, and a first receiving polarization plate for demodulating the first modulated optical signals to generate the first demodulated optical signals; and a second receiving module, comprising a plurality of second photodiodes for receiving a plurality of second demodulated optical signals, and a second receiving polarization plate for demodulating the second modulated optical signals to generate the second demodulated optical signals, wherein a polarization of the first transmitting polarization plate is orthogonal to a polarization of the second transmitting polarization plate, a polarization of the first receiving polarization plate and the polarization of the first transmitting polarization plate are the same, and a polarization of the second receiving polarization plate and the polarization of the second transmitting polarization plate are the same.

10. The visible light communication system according to claim 9, further comprising:

a third transmitting module, comprising a plurality of third visible light sources for generating a plurality of third optical signals, and a third transmitting polarization plate for modulating the third optical signals to generate a plurality of third modulated optical signals; and a third receiving module, comprising a plurality of third photodiodes for receiving a plurality of third demodulated optical signals, and a third receiving polarization plate for demodulating a plurality third modulated optical signals to generate the third demodulated optical signals;

wherein a polarization of the third transmitting polarization plate is not orthogonal to the polarization of the second transmitting polarization plate, and a polarization of the third receiving polarization plate and the polarization of the third transmitting polarization plate are the same.

11. The visible light communication system according to claim 10, further comprising:

a fourth transmitting module, comprising a plurality of fourth visible light sources for generating a plurality of fourth optical signals, and a fourth transmitting polarization plate for modulating the fourth optical signals to generate a plurality of fourth modulated optical signals; and a fourth receiving module, comprising a plurality of fourth photodiodes for receiving a plurality of fourth demodulated optical signals, and a fourth receiving polarization plate for demodulating the plurality of fourth modulated optical signals to generate the fourth demodulated optical signals;

wherein a polarization of the fourth transmitting polarization plate is orthogonal to the polarization of the third transmitting polarization plate, and a polarization of the fourth receiving polarization plate and the polarization of the fourth transmitting polarization plate are the same.

12. The visible light communication system according to claim 9, wherein the first receiving module further comprises a first lens, disposed between the first photodiodes and the first receiving polarization plate.

13. The visible light communication system according to claim 9, wherein the second receiving module further comprises a second lens, disposed between the second photodiodes and the second receiving polarization plate.

14. A visible light communication system, comprising:
a transmitting terminal, comprising:
at least one transmitting module group, comprising:
a first transmitting module, comprising a plurality of first visible light sources for generating a plurality of first optical signals, and a first transmitting polarization plate for modulating the first optical signals to generate a plurality of first modulated optical signals; and
a second transmitting module, comprising a plurality of second visible light sources for generating a plurality of second optical signals, and a second transmitting polarization plate for modulating the second optical signals to generate a plurality of second modulated optical signals; and
a receiving terminal, comprising:
a first receiving module, comprising a plurality of first photodiodes for receiving a plurality of first demodulated optical signals, and a first receiving polarization plate for demodulating the first modulated optical signals to generate the first demodulated optical signals; and
a second receiving module, comprising a plurality of second photodiodes for receiving a plurality of second demodulated optical signals, and a second receiving polarization plate for demodulating the plurality of second modulated optical signals to generate the second demodulated optical signals; and
a polarization controller, configured to determine a light intensity of the first demodulated optical signals received by the first receiving module, and determine a light intensity of the second demodulated optical signals received by the second receiving module, to rotate the first receiving polarization plate and the second receiving polarization plate,
wherein a polarization of the first transmitting polarization plate is orthogonal to a polarization of the second transmitting polarization plate, a polarization of the first receiving polarization plate and the polarization of the first transmitting polarization plate are the same, and a polarization of the second receiving polarization plate and the polarization of the second transmitting polarization plate are the same.

15. The visible light communication system according to claim 14, wherein when the light intensity is larger than or equal to a preset light intensity, the polarization controller does not rotate the first receiving polarization plate and the second receiving polarization plate.

16. The visible light communication system according to claim 14, wherein when the light intensity is smaller than a preset light intensity, the polarization controller rotates the first receiving polarization plate and the second receiving polarization plate.

17. The visible light communication system according to claim 14, wherein the at least one transmitting module group further comprises:
a third transmitting module, comprising a plurality of third visible light sources for generating a plurality of third optical signals, and a third transmitting polarization plate for modulating the third optical signals to generate a plurality of third modulated optical signals;
the receiving terminal, further comprising:
a third receiving module, comprising a plurality of third photodiodes for receiving a plurality of third demodulated optical signals, and a third receiving polarization plate for demodulating the plurality of third modulated optical signals to generate the third demodulated optical signals,
wherein the polarization controller rotates the first receiving polarization plate, the second receiving polarization plate, and the third receiving polarization plate according to the light intensity of the first demodulated optical signals received by the first receiving module, the light intensity of the second demodulated optical signals received by the second receiving module, and a light intensity of the third demodulated optical signals received by the third receiving module; a polarization of the third transmitting polarization plate is not orthogonal to the polarization of the second transmitting polarization plate; and a polarization of the third receiving polarization plate and the polarization of the third transmitting polarization plate are the same.

18. The visible light communication system according to claim 17, wherein
the at least one transmitting module group further comprises:
a fourth transmitting module, comprising a plurality of fourth visible light sources for generating a plurality of fourth optical signals, and a fourth transmitting polarization plate for modulating the fourth optical signals to generate a plurality of fourth modulated optical signals; and
the receiving terminal, further comprising:
a fourth receiving module, comprising fourth photodiodes for receiving a plurality of fourth demodulated optical signals, and a fourth receiving polarization plate for demodulating the plurality of fourth modulated optical signals to generate the fourth demodulated optical signals,
wherein the polarization controller determines the light intensity of the first demodulated optical signals received by the first receiving module, determines the light intensity of the second demodulated optical signals received by the second receiving module, determines the light intensity of the third demodulated optical signals received by the third receiving module, and determines a light intensity of the fourth demodulated optical signals received by the fourth receiving module, to rotate the first receiving polarization plate, the second receiving polarization plate, the third receiving polarization plate, and the fourth receiving polarization plate; and a polarization of the fourth transmitting polarization plate is orthogonal to the polarization of the third transmitting polarization plate, and a polarization of the fourth receiving polarization plate and the polarization of the fourth transmitting polarization plate are the same.

* * * * *